United States Patent
Mortsolf et al.

(10) Patent No.: US 6,229,804 B1
(45) Date of Patent: May 8, 2001

(54) GATEKEEPER ELECTION METHODS FOR INTERNET TELEPHONY

(75) Inventors: Timothy G. Mortsolf, Lisle; Kenneth L. Peirce, Jr., Barrington; Matthew Harper, Arlington Heights; Thomas M. Stoner, Palatine, all of IL (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/193,691

(22) Filed: Nov. 17, 1998

(51) Int. Cl.[7] .................................................. H04L 12/66

(52) U.S. Cl. ............................................. 370/352; 709/244

(58) Field of Search ...................................... 370/352, 230, 370/252, 259, 261, 267, 270, 271, 351, 353, 356, 382, 354, 359; 379/88.07, 88.13, 258, 243, 244, 229; 709/201, 202, 243, 244

(56) References Cited

U.S. PATENT DOCUMENTS

| 5,528,595 | 6/1996 | Walsh et al. ......................... 370/402 |
| 5,835,726 | * 11/1998 | Shwed et al. ....................... 709/229 |
| 5,991,878 | * 11/1999 | McDonough et al. ............... 713/200 |
| 6,006,253 | * 12/1999 | Kumar et al. ....................... 709/204 |
| 6,018,360 | * 1/2000 | Stewart et al. ...................... 348/15 |
| 6,031,896 | * 2/2000 | Gardell et al. .................... 379/88.17 |
| 6,067,529 | * 5/2000 | Ray et al. ............................. 705/26 |

OTHER PUBLICATIONS

ITU-T, Series H, Packet Based Multimedia Systems (H-323), (1998).

ITU-T, H-225.0, Version 2, Line Transmission of NonTelephone Signals (Mar. 25, 1997).

\* cited by examiner

*Primary Examiner*—Dang Ton
*Assistant Examiner*—Phirin Sam
(74) *Attorney, Agent, or Firm*—McDonnell Boehner Hulbert & Berghoff (57) ABSTRACT

An election protocol or method is described for use in Internet Telephony, in which a gatekeeper is elected to serve as an active gatekeeper. The group of gatekeepers elect one gatekeeper in a zone to act as a primary gatekeeper that responds to gatekeeper request messages by broadcasting active gatekeeper claim messages that contain a unique gatekeeper priority value for the gatekeeper. The gatekeepers compare the received gatekeeper priority value with their own gatekeeper priority value and either broadcast another active gatekeeper claim message (if they are higher ranked) or do not broadcast another active gatekeeper claim message (if they are lower ranked). This process sorts the gatekeepers into a hierarchy with the highest ranked gatekeeper designated to respond to gatekeeper request messages. The other gatekeepers stand by in an idle mode and do not respond to gatekeeper requests. The other gatekeepers are ranked in priority in accordance with a gatekeeper priority value assigned to each gatekeeper. If the primary gatekeeper should go down (for example, due to either a graceful shutdown by a system administrator or due to a machine failure), a new gatekeeper is promoted to act as the primary gatekeeper based on the ranking of the gatekeepers, or the remaining gatekeepers can go through the iterative election process again.

28 Claims, 3 Drawing Sheets

FIG. 4

GATEKEEPER ELECTION METHODS FOR INTERNET TELEPHONY

BACKGROUND OF THE INVENTION

A. Field of the Invention

This invention is related to the technology presently known as Internet telephony (sometimes referred to in the art as IP Telephony, where IP stands for Internet Protocol) and the process by which digitized voice is treated as data and transmitted across a digital data network between the calls' participants. More particularly, the invention relates to a method and protocol by which a plurality of IP Telephony Gatekeepers may organize themselves into a hierarchy such that one of the Gatekeepers is elected as an active Gatekeeper and designated to respond to gatekeeper request messages, with the other Gatekeepers remaining in a standby mode.

B. Description of Related Art

Internet telephony presents an attractive alternative for long distance telephone calls, as compared to the public switched telephone network (PSTN), which has been the traditional transmission medium. The primary advantage is cost. Long distance service providers for the PSTN offer domestic services at rates ranging from roughly 10 to 30 cents per minute, and international rates for substantially more, depending on the time of day, day of the week, and the distances involved. In contrast, the cost of Internet telephony anywhere in the world is potentially the cost of a local telephone call to the local Internet telephony provider at one end and the cost of a local call from an Internet telephony service provider at the far end to the destination telephone. Once the call is routed from the local Internet telephony provider onto the Internet, the transmission of the data from the local Internet telephony provider to the far end Internet telephony provider is free for all practical purposes, regardless of where the two parties are located. The same holds true for whether the call is sent over the Internet or over a private data network.

Internet service providers are generally believed to be a suitable entity to provide Internet telephony services. Such entities generally have equipment that can be used for performing the function of placing and terminating calls on the Internet: i.e., a Gateway or Terminal in accordance with the H.323 and H.225 ITU-T Standards. The ITU-T H.323 and H.225 Standard documents, presently in a draft form, are both hereby fully incorporated by reference herein.

More particularly, the function of a Gateway/Terminal can be preformed in the same devices that are used by most Internet service providers for Internet access. These devices are known in the art as Network Access Servers or Remote Access Servers. Such devices are commercially available from 3Com Corporation and other telecommunications equipment manufacturers such as Ascend Communications, Lucent Technologies (successor to Livingston Enterprises), and Multitech.

A representative Network Access Server is the Total Control Enterprise Network Hub from 3Com Corporation, described in the patent of Dale M. Walsh, et al., U.S. Pat. No. 5,528,595, which is fully incorporated by reference herein. This device has a telephone line interface that is connected to a high-speed multiplexed digital PSTN telephone line, such as a T1 line. The device further provides a plurality of digital modems to perform signal conversions on the data from the telephone line channels and a bus network connecting the modems to a network interface card or module. The network interface couples the device to a local or wide area network, such as the ISP backbone network, corporate LAN or WAN, or the Internet. These types of devices can be used in Internet telephony as described herein.

Figure 1:
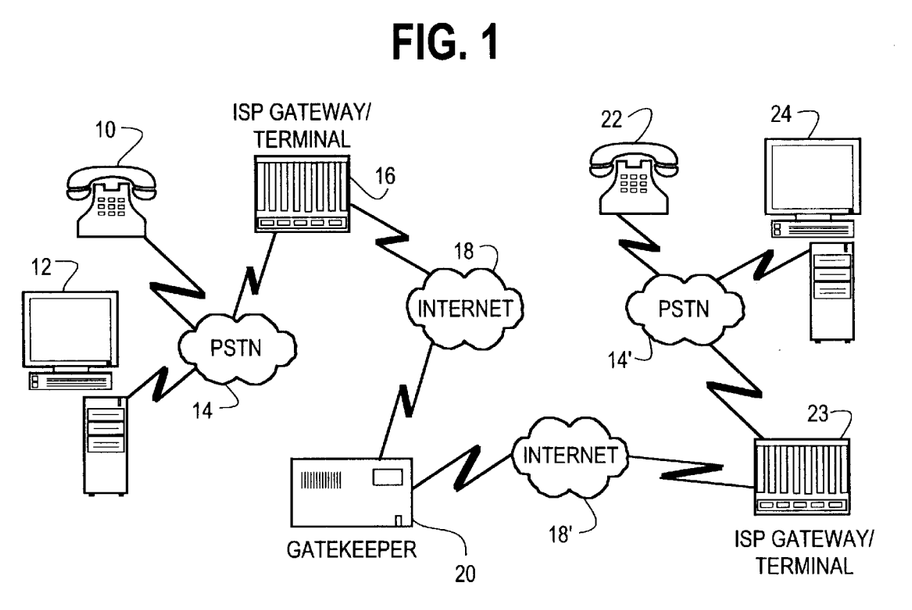
FIG. 1 is an illustration of a typical Internet telephony arrangement.

FIG. 1 depicts one possible embodiment of a basic IP telephony scenario. An Internet telephony call can take place with the calling party either using a conventional telephone 10 or a personal computer 12 equipped with a modem, speaker and microphone, and a suitable commercially available telephone software program such as Megaphone ™. The call is transmitted over the local Public Switched Telephone Network (PSTN) 14 (typically as a local call) to an Internet Service Provider (ISP) Gateway/Terminal 16. The ITU-T H.225/H.323 specifications provide further details (not important here) concerning the functions of the Gateway/Terminal 16. The call is then routed onto the Internet 18 and forwarded to a Gatekeeper 20 in accordance with the H.323 and H.225 standards. The Gatekeeper 20 may be embodied as a general purpose computer, or as one function performed by an existing piece of telecommunications equipment such as a network access server. The Gatekeeper 20 determines where to send the call over the Internet 18' to the proper terminating ISP Gateway/Terminal 23 for the called party. The terminating Gateway/Terminal 23 calls the called party over the PSTN 14', either to a conventional telephone set 22 or to a PC 24, and facilitates communication between either the telephone 10 or computer 12 at the near end with the telephone 22 or computer 24 at the far end.

There are 3 types of calls that can be made with Internet telephony:
1. PC to PC (PCPC): This type of call has both users sitting at their personal computers (PCs). The PCs have handsets or microphone units which takes the speech and digitizes the speech.
2. PC to Telephone (PCTL): This type of call allows a PC user to call the other party on their telephone.
3. Telephone to Telephone (TLTL): This type of call allows for both parties to use a telephone. For all three types of calls, the call is carried for free over the Internet for the bulk of the distance between the users. The public switched telephone network is used only at the ends, i.e., at 14 between the calling party and the local Internet service provider, and at 14' between a call termination gateway and the called party at the far end. In most cases, these calls will ordinarily be local calls with no long distance telephone charges associated therewith. In contrast, a conventional telephone call is routed entirely over the PSTN, and if the call is over a substantial geographic extent substantial per-minute long distance charges will accrue for the person that initiated the call.

In a representative proposed implementation of IP telephony, the following sequence of events occur:
1. A calling party dials (via telephone 10) over the local PSTN 14 the number of their Internet telephony company's Gateway/Terminal 16. (This is similar to the way a pre-paid calling card works today.) The initiating Gateway/Terminal 16 is typically a Remote Access Server such as described above, or some other similar product or system that couples a telephone line to a packet switched data network 18.
2. The same party then dials the number of the desired party (i.e., the call recipient at 22 or 24) for the initiating Gateway/Terminal 16 to use to connect the call over the Internet 18.
3. The initiating Gateway/Terminal 16 has prior knowledge as to which node on the network (i.e., Gatekeeper 20) is it supposed to use to get closest to the call recipient's area code. Alternatively, it sends out a gatekeeper request message seeking a Gatekeeper to handle the call. In accordance with the H.323 specification, in any one particular defined region or "zone" (described more hereafter), only one Gatekeeper may respond to the gatekeeper request message. A Gatekeeper in the zone answers the gatekeeper request message with either a gatekeeper accept message or a gatekeeper reject message, depending on whether the Gatekeeper is the active Gatekeeper in the zone.

4. Assuming that the initiating Gateway/Terminal 16 receives a gatekeeper accept message from the Gatekeeper 20, the initiating Gateway/Terminal 16 now asks for connection information from the Gatekeeper 20 on behalf of the call.

5. The Gatekeeper 20 sets up the call with the proper terminating Gateway/Terminal 23 for the call recipient. For example, the call recipient may have an Internet service agreement with a local Internet service provider operating Gateway/Terminal 23. The terminating Gateway/Terminal 23 in this example comprises a network access server maintained by the Internet service provider a few miles from the call recipient's residence.

6. The Gatekeeper 20 then provides the routing information necessary for the initiating Gateway/Terminal 16 to send its data to the terminating Gateway/Terminal 23.

7. The terminating Gateway 23 then places a call over the PSTN 14' to the called party and then sends the call data from the Internet 18 to the called party. The PSTN converts the digitized voice back to audio for the called party's telephone.

Implementation of the above, somewhat simplified, example requires the solution of some difficult problems that are not addressed in the H.323 and H.225 standards documents, and, to the knowledge of the present inventors, have not been solved by those working in the art. For one thing, in any particular region or H.323 "zone" (which may be a building, a city block, or some other discrete area in which a network or group of networks are bounded either geographically, logically, or by ownership of networks), the H.323 standard specifies that one, and only one, Gatekeeper (i.e., Gatekeeper 20) is supposed to respond to Gatekeeper request messages from initiating Gateway/Terminals. In actuality, there may be several, even many Gatekeepers in the region or zone. In the present state of the art, the individual Gatekeepers may not be aware of each other, or know whether the other Gatekeepers are active (i.e., designated to respond to gatekeeper request messages) or even on-line at any given instant. This is particularly so if the H.323 "zone" is a geographic region that incorporates networks owned by two or more different entities. Furthermore, over time, the number of Gatekeepers in the zone and their status will change repeatedly, and without any manner of predictability of knowing which Gatekeepers will be on-line and which Gatekeepers will be active.

Given this situation, several problems can occur: (1) more than one Gatekeeper in the zone responds to an active gatekeeper message, in violation of the standard; (2) the active Gatekeeper may go down due to technical problems or due to graceful shut-down by the system operator, and the remaining Gatekeepers do not whether to respond to active gatekeeper claims; and (3) new Gatekeepers may come on line and will not know whether or when they should respond to active Gatekeeper request messages.

The present invention addresses these problems. It provides a method and protocol by which Gatekeepers in a zone may perform an orderly ranking of each other with respect to all the other on-line Gatekeepers that are in the same zone. The above-referenced problems are expected to be minimized or not occur, resulting in an improvement in the efficiency and efficacy of routing telephone calls over the Internet.

SUMMARY OF THE INVENTION

As noted above, the typical Internet telephony situation requires the use of a Gatekeeper to determine where to send a particular Internet telephony call. The problem arises of how should multiple Gatekeepers in a particular geographic region or zone respond to gatekeeper request messages from the initiating Gateway/Terminals.

We provide methods for placing a Gatekeeper into a hierarchy among other the Gatekeepers in a zone in order to control whether the Gatekeeper, or another Gatekeeper, is designated to be an active Gatekeeper and respond to a gatekeeper request message. As used herein the term "active gatekeeper" means the Gatekeeper that is designated or elected to respond to gatekeeper requests from initiating Gateway/Terminals.

The method involves assigning a gatekeeper priority value to each of the Gatekeepers in the zone. The gatekeeper priority values are used to indicate the rank of one Gatekeeper with respect to another Gatekeeper, and preferably indicate the rank of each Gatekeeper with respect to all the other Gatekeepers. The gatekeeper priority values may be based on network addresses, chassis serial number, operator assigned numbers, or any other method (essentially unimportant) by which a unique value can be ascribed to a Gatekeeper, and the values of two or more Gatekeepers can be compared to determine rank or hierarchy of the Gatekeepers with respect to each other.

When one of the Gatekeepers is initialized or rebooted or otherwise brought on-line into the zone of Gatekeepers, it broadcasts a message, referred to herein as "a first active gatekeeper message" or alternatively as an "active gatekeeper claim". The active gatekeeper claim is essentially a message stating that the broadcaster claims or asserts to be the active Gatekeeper and the only Gatekeeper authorized to respond to gatekeeper request messages from an initiating Gateway/Terminal. The active gatekeeper message further includes the gatekeeper priority value assigned to the Gatekeeper. The particular format or structure of the active gatekeeper message is essentially unimportant, except that it should have these two pieces of information: it should be recognized as an assertion of active gatekeeper status, and it should contain the unique assigned gatekeeper priority value for the broadcasting Gatekeeper. Furthermore, the manner in which the active gatekeeper message is routed to the other Gatekeepers in the zone is also not particularly important, and can be in accordance with well known techniques.

Each Gatekeeper in the zone receives the active Gatekeeper claim or message from the first broadcasting Gatekeeper. The Gatekeepers each independently compare the gatekeeper priority value that they were assigned with the gatekeeper priority value contained in the first active gatekeeper message. In response to this comparison, the Gatekeepers each broadcast a new or subsequent active gatekeeper message or claim if their gatekeeper priority value is higher than the gatekeeper priority value in the first active gatekeeper message. On the other hand, those Gatekeepers that have a gatekeeper priority value that is lower than the gatekeeper priority value in the first active gatekeeper message do not broadcast another active gatekeeper message.

In a representative embodiment with a plurality of Gatekeepers in a zone, this process continues among the Gatekeepers in an iterative manner until no more active gatekeeper claim messages are received by any of the Gatekeepers. This iterative process is essentially a sorting process, as it ends with the Gatekeepers arranged in a hierarchy with the Gatekeeper having the highest gatekeeper priority value being elected or designated the active gatekeeper to respond to gatekeeper request messages.

It can thus be seen that as a result of this sorting process of broadcasting active gatekeeper claims among the Gatekeepers, comparing the received priority values with the internal priority value, and re-broadcasting an active gatekeeper claim message if the internal gatekeeper priority value was higher than that contained in the each of the received active gatekeeper claim messages, the Gatekeepers organize themselves in a hierarchical manner such that one, and only one, of the Gatekeepers is designated or elected as an active Gatekeeper to responds to gatekeeper request messages. Specifically, if no further active gatekeeper messages are received and the receiving Gatekeeper had the highest ranking gatekeeper priority value that it saw from the other Gatekeepers, it is deemed to be elected as active gatekeeper and thus permitted to respond affirmatively to gatekeeper request messages. On the other hand, if no further active gatekeeper requests are received and the gatekeeper has a gatekeeper priority value lower than any that it saw, the Gatekeeper will not be permitted to respond to generally broadcast gatekeeper request messages. (It also may only reject a gatekeeper request message specifically directed to it from an initiating Gateway/Terminal).

Moreover, because all of the active gatekeeper claim messages are received by all of the Gatekeepers in the zone, the Gatekeepers can rank(themselves in the hierarchy of gatekeepers since they know what their gatekeeper priority value is in relation to the gatekeeper priority values of the other Gatekeepers in the zone. The Gatekeepers are thus able to respond to gatekeeper requests depending upon the relationship between their gatekeeper priority value and the gatekeeper priority values received from the other Gatekeepers in the zone.

In one possible embodiment of the invention, when the elected active Gatekeeper responds to a gatekeeper request message, it is able to respond with an active gatekeeper claim message along with an alternate gatekeeper list. The alternate gatekeeper lists some or all of the other gatekeepers in the zone. The other Gatekeepers are designated as "standby gatekeepers", i.e., alternate Gatekeepers, and ranked or prioritized in accordance with their gatekeeper priority values resulting from the above sorting procedure. In the event that the active Gatekeeper becomes overloaded with gatekeeper requests or goes off-line (for whatever reason) the remaining Gatekeepers will have the information to know whether they should step in and assert the status of active Gatekeeper.

In a preferred embodiment, once a Gatekeeper has been elected to be an active Gatekeeper in this process (i.e., it has a gatekeeper priority value higher than that of the other gatekeepers), the active Gatekeeper periodically sends out to the standby gatekeepers an active gatekeeper claim message. This has several functions, including notifying the other Gatekeepers that it is still active and in service. For example, such a message could be sent out every 60 seconds. The standby Gatekeepers (i.e., the gatekeepers ranked 2-N, where N is some number of potential active Gatekeepers) then repeat the above ranking/election process by comparing the gatekeeper priority value of the active Gatekeeper with their own priority value, and broadcast a new active Gatekeeper claim message if their gatekeeper priority value is greater, etc. This process can be used to reorder the standby gatekeepers if one or more of them should go off line. If no active Gatekeeper claim message is received in a particular window of time (e.g., in 120 seconds), then presumably the active Gatekeeper has gone down and the standby gatekeepers send out active Gatekeeper messages to reinitiate the election of another active Gatekeeper.

A procedure is also described that can be used to organize the Gatekeepers into a hierarchy in the situation in which an operator may intentionally shut down an active Gatekeeper. In this embodiment, the gatekeeper priority value for the active Gatekeeper is temporarily changed to a new gatekeeper priority value. The new gatekeeper priority value has a lower priority value than the gatekeeper priority value normally associated with the Gatekeeper. For example, the priority value may temporarily be lowered to the lowest priority value available. Then, the active Gatekeeper transmits an new active gatekeeper message to the other Gatekeepers in the zone, with the new active gatekeeper message containing the new (i.e., temporarily lowered) gatekeeper priority value. This new active gatekeeper message initiates the election of another gatekeeper in the zone. The temporary lowered gatekeeper priority value insures that the active Gatekeeper, to be shut down, does not become re-elected as the active gatekeeper in the zone.

In yet another aspect of the invention, a Gatekeeper for use in Internet Telephony is provided. The Gatekeeper comprises a memory storing a gatekeeper priority value, the gatekeeper priority value for indicating a rank of the Gatekeeper with respect to a second gatekeeper. The Gatekeeper further comprises a central processing unit comparing the gatekeeper priority value with the gatekeeper priority values for other Gatekeepers in a zone of Gatekeepers. The Gatekeeper further includes a software program or other equivalent means for generating an active gatekeeper message. The means for generating the active Gatekeeper message is responsive to the central processing unit to generate the active gatekeeper message when the comparison of the gatekeeper priority value of the Gatekeeper with other gatekeeper priority values is such that the gatekeeper priority value is higher than the gatekeeper priority values received from the other gatekeepers in the zone.

These and other features and advantages of the present invention will become apparent for the following detailed description of a presently preferred embodiment of the invention.

BRIEF DESCRIPTION OF THE DRAWINGS

Presently preferred forms of the invention are depicted in the drawings, where like reference numerals refer to like elements in the various figures, and wherein.

DETAILED DESCRIPTION OF THE PREFERRED EMBODIMENT

Figure 2:
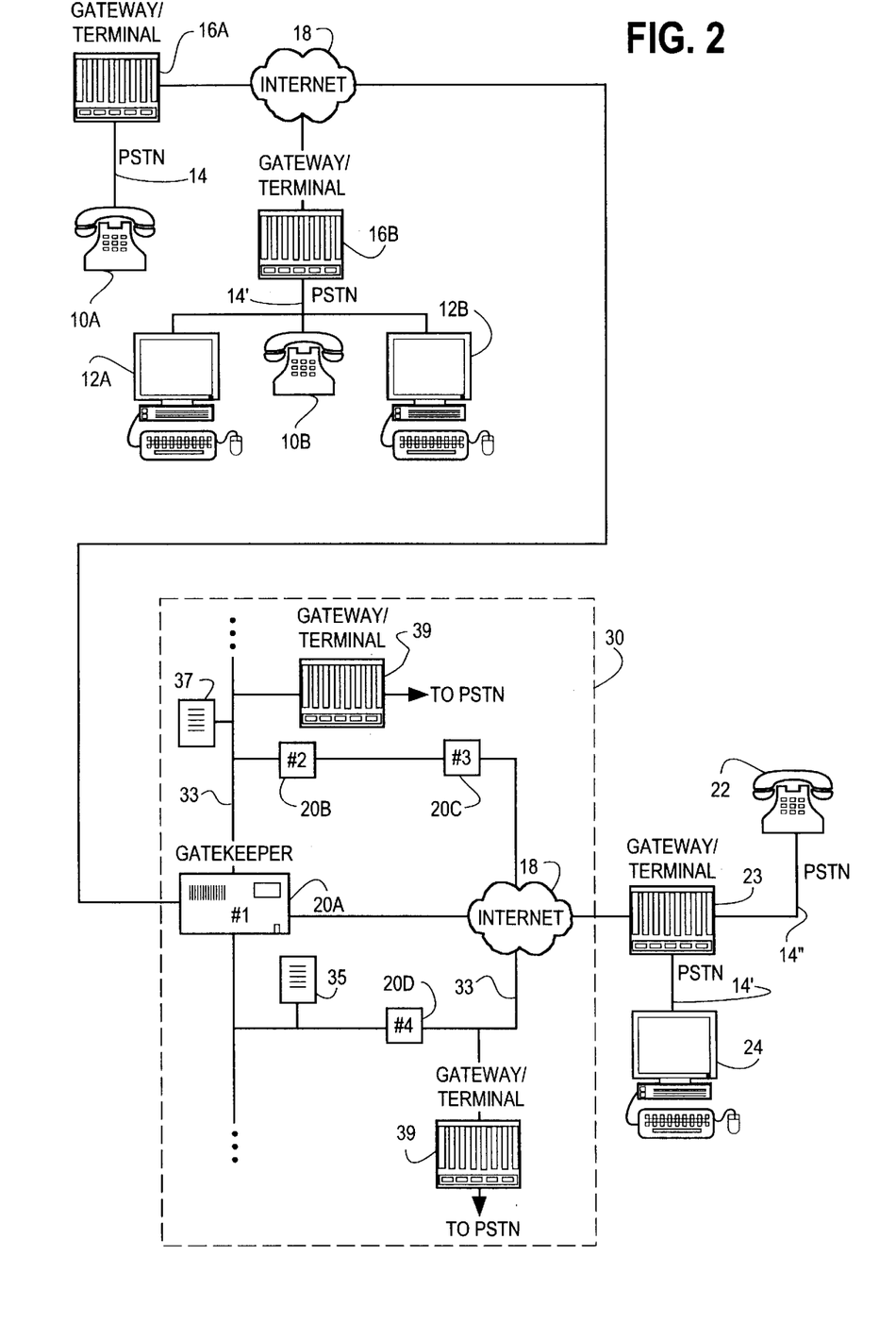
FIG. 2 is an illustration of a Internet telephony arrangement that may be used in accordance with one possible embodiment of the invention.

Referring now to FIG. 2, one possible environment in which the invention may be practiced is illustrated schematically. In the Figure, Gateway/Terminal 16A acts as the initiating Gateway/Terminal for a user operating phone 10A who wishes to place an internet telephony call to a person operating telephone 22. The initiating Gateway/Terminal 16A sends out a gatekeeper request message over Internet 18 to a particular zone 30 that is associated with the telephone number associated with phone 22.

In the example of FIG. 2, the zone 30 represents some geographic or logically defined region in which there are four Gatekeepers 20A–20D. For example, the zone 30 may be a portion of a city or region having the same telephone number (847) 262- xxxx. In the zone 30, each of the gatekeepers 20A–20D are connected to each other over a IP packet switched network 33, the details of which are not important. For example, a single IP network 33 operated by a company, government entity or institution may link the gatekeepers 20A–20D together. Additional computers 35 and 37 may be linked to the network 33. Additionally, the zone 30 will typically include one or more Gateway/Terminals 39 that link the network 33 to the public switched telephone network so as to enable remote access to the network 33, internet access for remote users, internet telephony for subscribers in the zone, etc.

Figure 3:
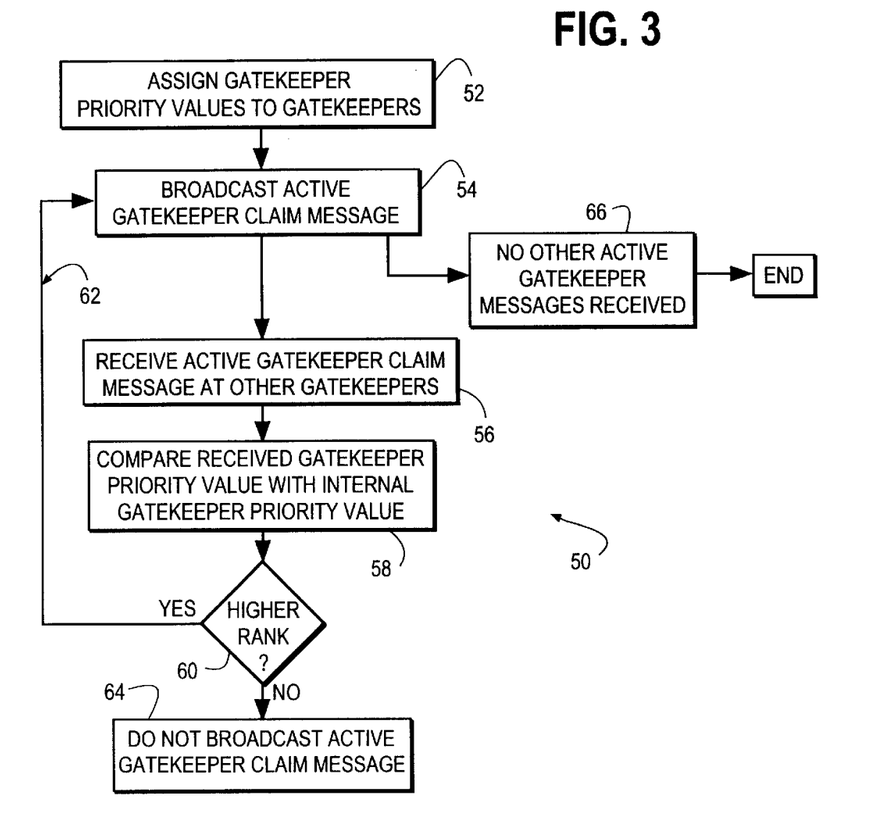
FIG. 3 is a flow chair illustrating the steps a group of Internet telephony gatekeepers may follow to elect an active gatekeeper in accordance with a preferred priority ranking method.

The Gatekeepers 20A–20D are ranked with respect to each other in accordance with the routine or sorting process 50 indicated in FIG. 3. Referring to FIGS. 2 and 3 in the following discussion, each of the gatekeepers 20A–20D in the zone 30 are assigned a unique gatekeeper priority value (step 52). The gatekeeper priority values are used to indicate the rank of each of the gatekeepers with respect to each other. In the example of FIG. 2, the Gatekeepers 20A–20D are given priority values of 1, 2, 3 and 4, respectively, by the operator of the network 33. Alternatively, the gatekeeper priority values could be based on the network address of the Gatekeeper, or the chassis serial number for the Gatekeeper. Still other methods of assignment of unique gatekeeper priority values could be arrived at, and they are considered to be equivalent the above ways, since the manner in which a Gatekeeper 20 is assigned the gatekeeper priority value is not particularly important.

In accordance with one feature of the invention, the Gatekeepers 20A–20D organize themselves in a hierarchy to know whether to respond to gatekeeper request messages from the remote initiating Gateway/Terminal 16A in accordance with a comparison of their own internal gatekeeper priority values with those of the other Gatekeepers in the zone. In one representative embodiment, when one of the Gatekeepers 20 in the zone 30 come on-line (e.g., the gatekeeper 20B with the Gatekeeper priority value of 2), it broadcasts (step 54 in FIG. 3) a first active gatekeeper message or claim to the other Gatekeepers in the zone 30. This message basically is an assertion of active gatekeeper status and includes the gatekeeper priority value assigned to the gatekeeper broadcasting said message (e.g., 2).

This active gatekeeper message or claim also starts the sorting process to sort the available Gatekeepers in the zone into a hierarchy and to elect one of them as the active Gatekeeper to respond to gatekeeper request messages. In particular, the active gatekeeper message broadcast by Gatekeeper 20B in the present example is received by all the other Gatekeepers 20A, 20C and 20D, as indicated in step 56 in FIG. 3. Each of the other Gatekeepers 20A, 20C and 20D compare their own unique gatekeeper priority value with the gatekeeper priority value contained in the active gatekeeper message received from the Gatekeeper 20B, as indicated in step 58 of FIG. 3. In response to this comparison, the Gatekeepers 20A, 20C and 20D can determine where they rank with respect to Gatekeeper 20B. For example, Gatekeeper 20C compares Gatekeeper 20B's value of 2 with its own value of 3, and can thus determine that it (Gatekeeper 20C) is higher in rank (step 60 in FIG. 3).

In accordance with a rule or procedure in which the higher gatekeeper priority value indicates higher rank, Gatekeepers 20C and 20D both are higher ranked than Gatekeeper 20B, and Gatekeeper 20A has a lower rank than Gatekeeper 20B. Since both Gatekeepers 20C and 20D know they are higher ranked than Gatekeeper 20B, but do not know how they rank with respect to other Gatekeepers in the zone, the sorting process continues (as indicated by the line 62 in FIG. 3) by Gatekeepers 20C and 20D both issuing active gatekeeper messages or claims. These messages, like the first active gatekeeper message, are an assertion of active gatekeeper status and include the gatekeeper priority value for the broadcasting gatekeeper. Furthermore, since Gatekeeper 20A has a lower gatekeeper priority value that that of gatekeeper 20B, Gatekeeper 20A does not broadcast an active gatekeeper message (step 64).

As a result, Gatekeepers 20C and 20D receive the active gatekeeper messages from the other gatekeeper (step 56), and then perform the comparison of their own unique gatekeeper priority value with that included in the received active gatekeeper message or claim (step 58). In this example, Gatekeeper 20D has the higher gatekeeper priority value (4). Thus, according to the method, Gatekeeper 20D issues another active gatekeeper claim or message to the other Gatekeepers in the zone (step 54). In the present example, there will be no further response from the other Gatekeepers since they all have gatekeeper priority values that are lower than that assigned to Gatekeeper 20D (step 66). Since there is no response, the sorting process is complete and the Gatekeepers know that Gatekeeper 20D has the highest gatekeeper priority value and is therefore elected by the sorting process to be the active gatekeeper to respond to gatekeeper request messages.

Furthermore, since all of the active gatekeeper messages in the sorting process are broadcast to all the gatekeepers in the zone, even those gatekeepers that are not elected as the active gatekeeper can determine where they are ranked with respect to the other gatekeepers in the zone 30. This feature is useful due to the fact that the elected gatekeeper may become overloaded, unavailable, or go off-line and the gatekeeper that is second in rank (e.g., gatekeeper 20C) can step in and take over. Furthermore, since over time the gatekeepers in the zone 30 may change, go out of service, etc., the above election process gives the gatekeepers their actual rank in real time, and is not based on any assumptions on whether or not there are new gatekeepers, whether they are on line, etc.

In the above example, it was assumed that the gatekeepers rank themselves in accordance with the rule that higher gatekeeper priority value indicates higher rank. In particular, a Gatekeeper is not permitted to respond to gatekeeper requests messages if its unique gatekeeper priority value is lower than a gatekeeper priority value it received from one of the other Gatekeepers. It will be appreciated that other rules could be adopted, such as ranking in the reverse order. Further, it could be possible to change the gatekeeper priority values assigned to the gatekeepers periodically, to avoid one gatekeeper being elected too frequently as the active gatekeeper and initiate some load sharing.

In a preferred implementation of the method, this sorting routine is performed periodically as an interval $\tau$, where $\tau$ is given some value of perhaps 30 seconds or 60 seconds. In this embodiment, the active gatekeeper periodically broadcasts an active gatekeeper claim to the other Gatekeepers in the zone to re-start the sorting process. In the example of FIG. 2, the Gatekeeper 20D sends out an active gatekeeper claim message to the Gatekeepers 20A–20C. Since Gatekeepers 20A–20C each have a lower gatekeeper priority value than that of Gatekeeper 20D, they do not respond and Gatekeeper 20D knows that it is still the active gatekeeper. On the other hand, if Gatekeeper 20C had been elected active gatekeeper (due to the situation where Gatekeeper 20D was unavailable or off-line when the previous election or sorting process took place), then the status of active gatekeeper will be transferred from Gatekeeper 20C to Gatekeeper 20D when Gatekeeper 20C initiates the next sorting process.

As can be seen from the above example, the invention can be practiced when there are just two Gatekeepers (in which case the sorting routing iterates only once), and in the situation in which there are three, four, or any arbitrary number of Gatekeepers in the zone. In the case of three or more Gatekeepers, the process may iterate more than once if the Gatekeeper that initiates the process with the first active gatekeeper is also not the one that has the highest priority value or rank in the zone.

In the preferred embodiment of the invention, when the active gatekeeper (e.g., gatekeeper 20D in FIG. 2) responds to a gatekeeper request message from an initiating Gateway/Terminal 16A, it provides an alternate gatekeeper list to the initiating Gateway/Terminal 16A. The list is prioritized based on the gatekeeper priority values it received from the other Gatekeepers in the zone 30. Such a list can be readily stored in a memory in the Gatekeeper 20D. Since Gatekeeper 20D received active gatekeeper claim messages from Gatekeepers 20B and 20C (but not 20A), it can append to the gatekeeper accept message a list of the IP address of Gatekeepers 20B and 20C and identify their rank with respect to each other. In the event that something should happen to Gatekeeper 20D, the initiating Gateway/Terminal can attempt to have Gatekeeper 20C act as the new active Gatekeeper for the call.

In yet another possible embodiment of the invention, the operator of the active gatekeeper intentionally shuts down the active gatekeeper yet does so in a graceful fashion, with the active gatekeeper status transferred in an orderly manner to another Gatekeeper. For example, when the operator seeks to bring Gatekeeper 20D off-line, it temporarily lowers the gatekeeper priority value to some new value not normally associated with the gatekeeper (e.g., 0 in the present example). Preferably, this value is lower than any number assigned to the other Gatekeepers to prevent the gatekeeper from being re-elected. The assignment of the new value is readily done if the Gatekeeper priority value is stored in a memory in the Gatekeeper. Then, the active Gatekeeper (20D in the present example) transmits a new active gatekeeper message to the other gatekeepers in the zone. The new active gatekeeper message contains the new (e.g., lower) gatekeeper priority value. The new active gatekeeper message broadcast by active Gatekeeper 20D initiates the election of another Gatekeeper in the zone 30 to become the new active gatekeeper. Later, when the Gatekeeper 20D is brought back on-line, it's value can either remain where it was or it can be returned to the original value associated with the gatekeeper, e.g., 4 for Gatekeeper 20D. Then Gatekeeper 20D then broadcasts a new active gatekeeper message and the sorting process starts again.

Figure 4:
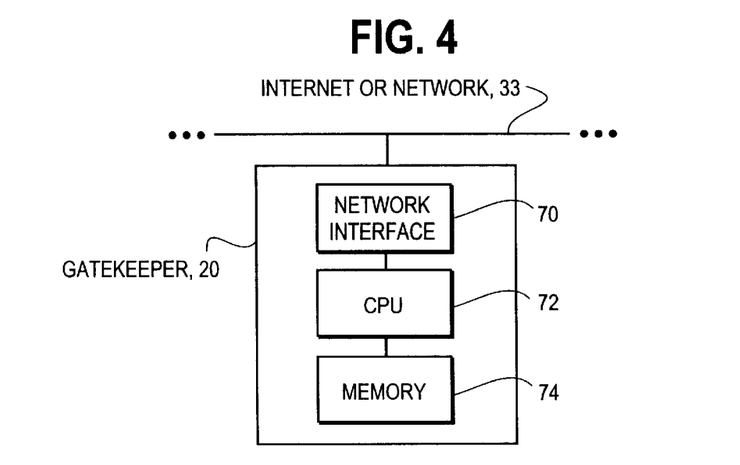
FIG. 4 is a block diagram of a representative Gatekeeper.

Referring now to FIG. 4, the manner in which the Gatekeeper may be embodied is not considered critical. The gatekeeper functionality may be incorporated into another device that functions as a network element such as a router, network access server, general purpose computer, or other device. In a preferred implementation of the present method, however, the gatekeeper 20 has a network interface 70 which couples a central processing unit or microprocessor 72 to the Internet or other network. The network interface unit 70 contains well known protocol stacks and software for transmitting and receiving packets of data from the network 33 and allowing the gatekeeper to receive messages from Gateway/Terminals, and other entities on the network such as other Gatekeepers. The Gatekeeper also has a unique chassis number and IP address on the network 33 that is stored in a memory 74 in the gatekeeper. This chassis serial number, IP address or even an operator supplied number is used as a unique gatekeeper priority value in accordance with the above sorting method. Further the memory 74 (or a separate memory) stores a software program to implement the H.323 and H.225 standards. This program is modified to perform the gatekeeper election methods described herein. Persons of ordinary skill in the art and familiar with the H.323 and H.225 specifications will be able to program such software into the memory 74 using only ordinary skill and effort in view of the above detailed description.

It will be further understood that the central processing unit 72 compares the gatekeeper priority value stored in memory 74 with the gatekeeper priority values for the other gatekeepers in the zone that are passed through the network interface 70 to the CPU during execution of the sorting process of FIG. 3.

Further, it will be appreciated that a software routine is loaded in the memory 74 which can be used for generating an active gatekeeper message, and issues the active gatekeeper message to another gatekeeper in the zone when the gatekeeper 20 comes on-line, is initialized, or has a higher gatekeeper priority value than those received during execution of the sorting process. This software routine is responsive to the comparisons performed in the central processing unit to generate active gatekeeper messages depending on the relationship between the gatekeeper priority value in the gatekeeper 20 and the gatekeeper priority values for the other gatekeepers in the zone.

From the foregoing description, persons skilled in the art will appreciate that the invention is not platform-specific, and that the invention can be embodied in diverse forms of Gatekeepers. Further, various alternative methods of implementing the sorting procedure and assigning gatekeeper priority values can be arrived at without departure from the spirit and scope of the invention. This true spirit and scope is defined by the appended claims, to be interpreted in light of the foregoing specification.

We claim:

1. A method for placing a gatekeeper in a zone into a hierarchy among other gatekeepers in said zone, said zone containing at least said gatekeeper and a second gatekeeper, comprising the steps of:

(a) assigning a first unique gatekeeper priority value to said gatekeeper and a second unique gatekeeper priority value to said second gatekeeper, said gatekeeper priority values for indicating the rank of said gatekeeper with respect to said second gatekeeper;

(b) broadcasting a first active gatekeeper message from said gatekeeper, said message comprising at least in part the gatekeeper priority value assigned to said gatekeeper broadcasting said message, said first active gatekeeper message indicating an assertion of active gatekeeper status;

(c) receiving said message at said second gatekeeper;

(d) said second gatekeeper comparing said first unique gatekeeper priority value contained in said active gatekeeper message received from said gatekeeper with said second unique gatekeeper priority value; and (e) in response to the comparison in step (d), said second gatekeeper either: broadcasting a second active gatekeeper message, or not broadcasting a second active gatekeeper message, depending on the relationship between the second unique gatekeeper priority value for said second gatekeeper and the first unique gatekeeper priority value assigned to said gatekeeper;

wherein said gatekeeper and said second gatekeeper may rank themselves in accordance with the relationship between said first unique gatekeeper priority value and said second unique gatekeeper priority value and thereby elect either said gatekeeper or said second gatekeeper be an active gatekeeper to respond to a gatekeeper request messages from an initiating Gateway/Terminal.

2. The method of claim 1, wherein said second gatekeeper is not permitted to respond to a gatekeeper request message if said first unique gatekeeper priority value is higher than said second unique gatekeeper priority value.

3. The method of claim 1, wherein said second gatekeeper is permitted to respond to a gatekeeper request messages if said first unique gatekeeper priority value is lower than the second unique gatekeeper priority value.

4. The method of claim 1, wherein said gatekeeper has a first unique gatekeeper priority value higher than said second unique gatekeeper priority value received from said second gatekeeper and is thereby is elected as said active gatekeeper, and wherein said active gatekeeper periodically broadcasts to said second gatekeeper an active gatekeeper message.

5. The method of claim 1, wherein said steps (b)–(e) are performed iteratively among three or more gatekeepers in said zone, each of said gatekeepers having a unique gatekeeper priority value.

6. The method of claim 5, wherein said gatekeeper has a first unique gatekeeper priority value higher than the unique gatekeeper priority value of the other gatekeepers in the zone and is thereby elected as an active gatekeeper, and wherein when said gatekeeper responds to a gatekeeper request message from an initiating Gateway/Terminal it provides an alternate gatekeeper list to said initiating Gateway/Terminal prioritized based on gatekeeper priority values it received from the other gatekeepers in said zone.

7. The method of claim 1, wherein upon intentional shutdown of said active gatekeeper by an operator of said active gatekeeper:

(1) said gatekeeper priority value for said active gatekeeper is temporarily changed to a new gatekeeper priority value, said new gatekeeper priority value having the lower priority value than said gatekeeper priority value normally associated with said gatekeeper; and (2) said active gatekeeper transmits a new active gatekeeper message to said other gatekeepers in said zone, said new active gatekeeper message containing said new gatekeeper priority, said new active gatekeeper message initiating election of another gatekeeper in said zone to become a new active gatekeeper.

8. The method of claim 7, wherein said new gatekeeper priority value comprises a priority value lower than any of the priority values for said other gatekeepers in said zone.

9. The method of claim 1, wherein said first and second unique gatekeeper priority values are associated with a network address of said gatekeeper and said second gatekeeper, respectively.

10. The method of claim 1, wherein said first and second unique gatekeeper priority values are associated with a chassis serial number of said gatekeeper and said second gatekeeper, respectively.

11. The method of claim 1, wherein said first and second unique gatekeeper priority values are assigned by an operator of said first and second gatekeepers.

12. A gatekeeper for Internet Telephony, comprising:

a memory storing a gatekeeper priority value for said gatekeeper; said gatekeeper priority value for indicating a rank of said gatekeeper with respect to a second gatekeeper to facilitate an election of an active gatekeeper to respond to gatekeeper request messages;

a central processing unit; said central processing unit comparing said gatekeeper priority value with gatekeeper priority values for other gatekeepers in a zone of gatekeepers; and a software routine for generating an active gatekeeper message and issuing said active gatekeeper message to another gatekeeper, said software routine responsive to said central processing unit to generate said active gatekeeper message depending on the relationship between said gatekeeper priority value and the gatekeeper priority values for other gatekeepers in said zone.

13. A gatekeeper for Internet Telephony, comprising:

a memory storing a gatekeeper priority value for said gatekeeper; said gatekeeper priority value for indicating a rank of said gatekeeper with respect to a second gatekeeper;

a central processing unit; said central processing unit comparing said gatekeeper priority value with gatekeeper priority values for other gatekeepers in a zone of gatekeepers; and a software routine for generating an active gatekeeper message and issuing said active gatekeeper message to another gatekeeper, said software routine responsive to said central processing unit to generate said active gatekeeper message depending on the relationship between said gatekeeper priority value and the gatekeeper priority values for other gatekeepers in said zone wherein said gatekeeper does not respond to a gatekeeper requests message received from an initiating Gateway/Terminal if said gatekeeper priority value is lower than the gatekeeper priority values it received from said other gatekeepers in said zone.

14. The gatekeeper of claim 12, wherein said gatekeeper is elected as an active gatekeeper and wherein said gatekeeper periodically broadcasts to said other gatekeepers in said zone an active gatekeeper message.

15. A gatekeeper for Internet Telephony, comprising:

a memory storing a gatekeeper priority value for said gatekeeper; said gatekeeper priority value for indicating a rank of said gatekeeper with respect to a second gatekeeper;

a central processing unit; said central processing unit comparing said gatekeeper priority value with gatekeeper priority values for other gatekeepers in a zone of gatekeepers; and a software routine for generating an active gatekeeper message and issuing said active gatekeeper message to another gatekeeper, said software routine responsive to said central processing unit to generate said active gatekeeper message depending on the relationship between said gatekeeper priority value and the gatekeeper priority values for other gatekeepers in said zone;

wherein said gatekeeper is elected as an active gatekeeper and wherein when said gatekeeper responds to a gatekeeper request from an initiating Gateway/Terminal it further provides an alternate gatekeeper list to said initiating Gateway/Terminal prioritized based on the gatekeeper priority values of other gatekeepers in said zone.

16. A gatekeeper for Internet Telephony, comprising:
- a memory storing a gatekeeper priority value for said gatekeeper; said gatekeeper priority value for indicating a rank of said gatekeeper with respect to a second gatekeeper;
- a central processing unit; said central processing unit comparing said gatekeeper priority value with gatekeeper priority values for other gatekeepers in a zone of gatekeepers; and
- a software routine for generating an active gatekeeper message and issuing said active gatekeeper message to another gatekeeper, said software routine responsive to said central processing unit to generate said active gatekeeper message depending on the relationship between said gatekeeper priority value and the gatekeeper priority values for other gatekeepers in said zone;
- wherein said gatekeeper is elected as an active gatekeeper, and wherein upon intentional shutdown of said gatekeeper by an operator of said gatekeeper:
  (1) said memory storing the gatekeeper priority value is temporarily changed to store a new gatekeeper priority value, said new gatekeeper priority value having a lower priority value than said gatekeeper priority value normally associated with said gatekeeper; and
  (2) said gatekeeper transmits a new active gatekeeper message to said other gatekeepers in said zone, said new active gatekeeper message containing said new gatekeeper priority value, wherein said new active gatekeeper message initiates election of another gatekeeper in said zone to become a new active gatekeeper.

17. The gatekeeper of claim 16, wherein said new gatekeeper priority value comprises a priority value lower than any of the priority values for said other gatekeepers in said zone.

18. The gatekeeper of claim 12, wherein said gatekeeper priority value is associated with a network address of said gatekeeper.

19. The gatekeeper of claim 12, wherein said gatekeeper priority value is associated with a chassis serial number of said gatekeeper.

20. The gatekeeper of claim 12, wherein said gatekeeper priority value is assigned by an operator of said gatekeeper.

21. An Internet Telephony gatekeeper discovery method for use with a plurality of gatekeepers in a zone, comprising the steps of:
- assigning a gatekeeper priority value to each of said gatekeepers, said gatekeeper priority value for indicating the rank of each of said gatekeepers with respect to each other;
- at least one of said gatekeepers broadcasting a first active gatekeeper message to the other of said gatekeepers, said first active gatekeeper message containing the gatekeeper priority value associated with said at least one of said gatekeepers;
- said gatekeepers receiving said broadcast active gatekeeper message and comparing said the gatekeeper priority value in said broadcast active gatekeeper message with the gatekeeper priority value assigned to the receiving gatekeepers,
- if the gatekeeper priority value of said gatekeeper receiving said broadcast active gatekeeper message is higher than the gatekeeper priority value in said broadcast active gatekeeper message, said gatekeeper receiving said broadcast active gatekeeper message broadcasting a second active gatekeeper message; and
- if the gatekeeper priority value of said gatekeeper receiving said broadcast active gatekeeper message is lower than the gatekeeper priority value in said broadcast active gatekeeper message, said gatekeeper receiving said broadcast active gatekeeper message not broadcasting a second active gatekeeper message;
- wherein a gatekeeper in said plurality of gatekeepers may be elected an active gatekeeper based on comparisons between the gatekeeper priority values in the broadcast active gatekeeper messages and the gatekeeper priority values assigned to said gatekeepers, and
- wherein said elected active gatekeeper may respond to a gatekeeper request message from an initiating Gateway/Terminal and the other of said plurality of gatekeepers may not respond to said gatekeeper request message.

22. The method of claim 21, wherein said first active gatekeeper message is broadcast by said at least one of said gatekeepers upon either initialization or rebooting of said gatekeeper.

23. The method of claim 21, wherein a gatekeeper in said plurality of gatekeepers having a gatekeeper priority value either higher than the highest gatekeeper priority value received from said other gatekeepers is elected as an active gatekeeper, and wherein said active gatekeeper periodically broadcasts to said other gatekeepers an active gatekeeper message.

24. The method of claim 21, wherein a gatekeeper in said plurality of gatekeepers having a gatekeeper priority value either higher than the highest gatekeeper priority value received from other gatekeepers is elected as an active gatekeeper, and wherein when said active gatekeeper responds to a gatekeeper request from said initiating Gateway/Terminal it provides an alternate gatekeeper list to said initiating Gateway/Terminal prioritized based on the gatekeeper priority values it received from said other gatekeepers.

25. The method of claim 21, wherein a gatekeeper in said plurality of gatekeepers having a gatekeeper priority value either higher than the highest gatekeeper priority value received from other gatekeepers is elected as an active gatekeeper, and wherein upon intentional shutdown of said active gatekeeper by an operator of said active gatekeeper:
  (1) said gatekeeper priority value for said active gatekeeper is temporarily changed to a new gatekeeper priority value, said new gatekeeper priority value having the lower priority value than said gatekeeper priority value normally associated with said gatekeeper; and
  (2) said active gatekeeper transmits a new active gatekeeper message to said other gatekeepers in said plurality of gatekeepers, said new active gatekeeper message containing said new gatekeeper priority value, said new active gatekeeper message initiating election of another gatekeeper in said plurality of gatekeepers to become a new active gatekeeper.

26. The method of claim 21, wherein said gatekeeper priority values assigned to said plurality of gatekeepers are associated with a network address of each of said respective gatekeepers.

27. The method of claim 21, wherein said gatekeeper priority values assigned to said plurality of gatekeepers are associated with a chassis serial number of each of said respective gatekeepers.

28. The method of claim 21, wherein said gatekeeper priority values assigned to said plurality of gatekeepers are assigned by an operator of each of said respective gatekeepers.

* * * * *